(12) United States Patent
Liu et al.

(10) Patent No.: US 12,438,763 B2
(45) Date of Patent: Oct. 7, 2025

(54) ELECTRONIC DEVICE

(71) Applicant: NTT DOCOMO, INC., Tokyo (JP)

(72) Inventors: Juan Liu, Beijing (CN); Wenjia Liu, Beijing (CN); Xiaolin Hou, Beijing (CN); Anxin Li, Beijing (CN); Lan Chen, Beijing (CN); Yoshihisa Kishiyama, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 62 days.

(21) Appl. No.: 18/579,750

(22) PCT Filed: Aug. 10, 2021

(86) PCT No.: PCT/CN2021/111822
§ 371 (c)(1),
(2) Date: Jan. 16, 2024

(87) PCT Pub. No.: WO2023/015450
PCT Pub. Date: Feb. 16, 2023

(65) Prior Publication Data
US 2024/0243960 A1    Jul. 18, 2024

(51) Int. Cl.
*H04L 23/02* (2006.01)
*H03M 7/30* (2006.01)
*H04L 27/26* (2006.01)

(52) U.S. Cl.
CPC .......... *H04L 27/2672* (2013.01); *H03M 7/70* (2013.01); *H04L 27/265* (2013.01)

(58) Field of Classification Search
CPC ... H04L 5/0048; H04L 27/2613; H04L 5/001; H04L 5/0007; H04L 27/2615; H04W 72/0406; H04W 76/27; H04W 56/00; H04B 1/7097
USPC ................................ 375/262, 260, 265, 299
See application file for complete search history.

(56) References Cited

U.S. PATENT DOCUMENTS

| | | | |
|---|---|---|---|
| 2018/0351713 A1* | 12/2018 | Wang | H04L 5/0053 |
| 2019/0097859 A1* | 3/2019 | Bala | H04L 27/2613 |
| 2020/0374167 A1* | 11/2020 | Zhang | H04L 27/2627 |
| 2021/0392596 A1* | 12/2021 | Huang | H04L 27/2626 |

* cited by examiner

*Primary Examiner* — Khai Tran
(74) *Attorney, Agent, or Firm* — Osha Bergman Watanabe & Burton LLP

(57) ABSTRACT

The present disclosure provides an electronic device, including: an input unit configured to obtain a sequence to be compressed, wherein the sequence to be compressed has Q time-domain symbol elements, and Q is an integer greater than zero; a processing unit configured to perform a zero-padding operation on the sequence to be compressed according to at least a part of a compression factor to determine a zero-embedded sequence, perform a discrete Fourier transform spreading operation according to the zero-embedded sequence to determine a spread sequence, and perform at least one of a data deletion operation and a data superimposition operation based on the spread sequence to determine a compressed sequence, wherein the compressed sequence has M frequency-domain symbols, M is an integer greater than zero, and M is less than or equal to Q.

10 Claims, 6 Drawing Sheets

Compression processing method 1000

ELECTRONIC DEVICE

TECHNICAL FIELD

The present disclosure relates to a field of wireless communication, specifically to an electronic device, and more specifically to an electronic device based on unified non-orthogonal waveform architecture.

BACKGROUND

A future 6G communication system requires higher on the Peak to Average Power Ratio (PAPR) of waveforms. Discrete Fourier Transform spread Orthogonal Frequency Division Multiplexing (DFT-s-OFDM), as an existing uplink waveform of 5G system, has a relatively low PAPR and is one of the important candidate waveforms of 6G. However, current DFT-s-OFDM schemes still cannot meet the requirements of 5G-Advanced communication system and 6G communication system. In addition, the 6G communication system further puts forward higher requirements on Out-Of-Band Emission (OOBE) and Spectrum Efficiency (SE) of waveforms.

At present, many improved schemes based on DFT-s-OFDM have been proposed, for example, an improved scheme based on Null Cyclic Prefix (NCP) and Unique Word (UW) and an improved scheme based on Frequency Domain Spectrum Shaping (FDSS) have been proposed. It is found through research that the improved scheme of NCP/UW may be summarized as performing pre-processing before a DFT module, and the FDSS technical measure may be summarized as performing post-processing after the DFT module.

In addition, an improved scheme of DFT-s-OFDM based on Non-Orthogonal Waveform (NOW) is also proposed at present. In this scheme, Faster-Than-Nyquist (FTN) modulation is introduced at the back end of inverse discrete Fourier transform (IFFT) to compress sampling point intervals in time domain.

However, the NOW scheme has the problem that it is difficult to be compatible with other existing technologies such as the NCP/UW scheme or the FDSS scheme.

SUMMARY OF THE DISCLOSURE

It is desirable to provide an electronic device to achieve good compatibility with the existing improved schemes based on DFT-s-OFDM.

According to an aspect of the present disclosure, there is provided an electronic device, including: an input unit configured to obtain a sequence to be compressed, wherein the sequence to be compressed has Q time-domain symbol elements, and Q is an integer greater than zero; a processing unit configured to perform a zero-padding operation on the sequence to be compressed according to at least a part of a compression factor to determine a zero-embedded sequence, perform a discrete Fourier transform spreading operation according to the zero-embedded sequence to determine a spread sequence, and perform at least one of a data deletion operation and a data superimposition operation based on the spread sequence to determine a compressed sequence, wherein the compressed sequence has M frequency-domain symbols, M is an integer greater than zero, and M is less than or equal to Q.

According to an aspect of the present disclosure, the processing unit is configured to perform an N-point discrete Fourier transform spreading operation according to the zero-embedded sequence to determine the spread sequence, and perform a first data deletion operation based on the spread sequence to determine the compressed sequence, wherein N is an integer multiple of M.

According to an aspect of the present disclosure, the processing unit is further configured to re-order according to the zero-embedded sequence to determine a plurality of zero-embedded subsequences, perform an M-point discrete Fourier transform spreading operation on each zero-embedded subsequence respectively to determine a plurality of spread subsequences, and perform the data superimposition operation based on the plurality of spread subsequences to determine the compressed sequence.

According to an aspect of the present disclosure, the data superimposition operation includes performing a phase compensation operation on the plurality of spread subsequences respectively, and superimposing the plurality of phase-compensated spread subsequences.

According to an aspect of the present disclosure, the processing unit is further configured to perform subcarrier mapping and inverse discrete Fourier transform according to the compressed sequence to determine a sequence to be transmitted.

According to an aspect of the present disclosure, the processing unit is further configured to further perform second data deletion after performing the subcarrier mapping and the inverse discrete Fourier transform according to the compressed sequence to determine the sequence to be transmitted.

According to an aspect of the present disclosure, the compression factor includes a first compression factor and a second compression factor, and in the zero-padding operation, the processing unit is further configured to compress a part of the sequence to be compressed by the first compression factor and compress another part of the sequence to be compressed by the second compression factor, to determine the zero-embedded sequence.

According to an aspect of the present disclosure, the electronic device further includes a receiving unit configured to receive compression information indicating at least the part of the compression factor.

According to an aspect of the present disclosure, the compression information is transmitted via any one of RRC, MAC CE and DCI.

According to an aspect of the present disclosure, there is provided a compression processing method, including: an input step configured to obtain a sequence to be compressed, wherein the sequence to be compressed has Q time-domain symbol elements, and Q is an integer greater than zero; a processing step configured to perform a zero-padding operation on the sequence to be compressed according to at least a part of a compression factor to determine a zero-embedded sequence, perform a discrete Fourier transform spreading operation according to the zero-embedded sequence to determine a spread sequence, and perform at least one of a data deletion operation and a data superimposition operation based on the spread sequence to determine a compressed sequence, wherein the compressed sequence has M frequency-domain symbols, M is an integer greater than zero, and M is less than or equal to Q.

BRIEF DESCRIPTION OF THE DRAWINGS

The above and other objects, features and advantages of the present disclosure will become more apparent by describing embodiments of the present disclosure in more detail with reference to accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals generally represent like parts or steps.

DESCRIPTION OF THE EMBODIMENTS

Figure 1:
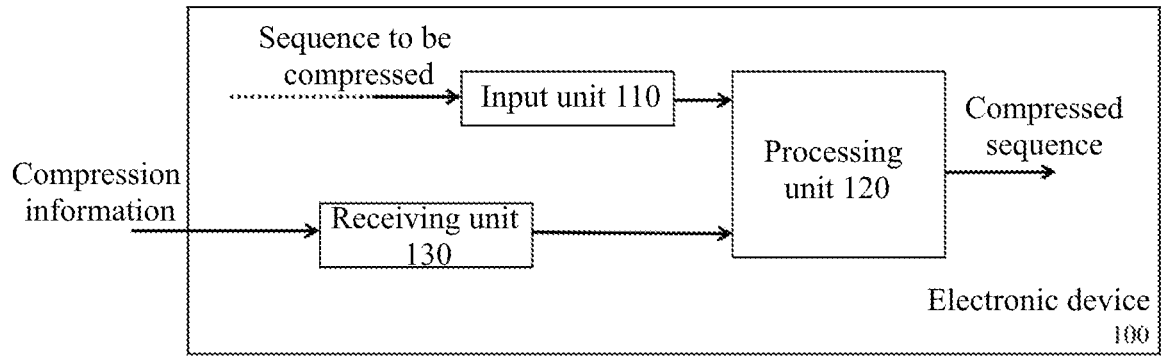
FIG. 1 is a block diagram illustrating an electronic device 100 according to an embodiment of the present disclosure.

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure.

A future 6G communication system requires higher on the Peak to Average Power Ratio (PAPR), the Out-Of-Band Emission (OOBE) and the Spectrum Efficiency (SE) of waveforms. Discrete Fourier Transform Spread Orthogonal Frequency Division Multiplexing (DFT-s-OFDM), as an existing uplink waveform of 5G system, has a relatively low PAPR and is one of the important candidate waveforms of 6G. However, current DFT-s-OFDM schemes still cannot meet the requirements of 5G-Advanced communication system and 6G communication system. At present, many improved schemes based on DFT-s-OFDM have been proposed, in an attempt to improve the above multiple performances.

For example, a DFT-s-OFDM scheme based on Null Cyclic Prefix (NCP) has been proposed at present. The DFT-s-OFDM scheme based on NCP reduces OOBE and improves SE by inserting a zero sequence instead of a traditional cyclic prefix before discrete Fourier transform (DFT) is performed on data. Similarly, a DFT-s-OFDM scheme based on Unique Word (UW) has also been proposed at present. The DFT-s-OFDM scheme based on UW reduces OOBE and improves SE by inserting a known sequence instead of a traditional cyclic prefix before discrete Fourier transform (DFT) is performed on data. As another example, a DFT-s-OFDM scheme based on Frequency Domain Spectral Shaping (FDSS) is also proposed at present. This scheme adjusts correlation and distribution of time-domain signals by shaping frequency-domain signals, thus reducing the PAPR.

In addition, a DFT-s-OFDM scheme based on Faster-Than-Nyquist (FTN) modulation is also proposed at present, which is also referred as to as the Non-Orthogonal Waveform (NOW) scheme. In this scheme, further FTN modulation is performed on DFT-s-OFDM, so as to realize compression of time-domain sampling signals and reduce the PAPR while improving the SE. However, although the DFT-s-OFDM scheme based on FTN modulation can realize compression of sampling signals, it needs to compress a time-domain sampled signal by inserting a Cyclic Prefix (CP) into a sequence after an IFFT operation and a parallel/serial conversion operation and performing FTN modulation on it, so as to improve the spectral efficiency. That is, this scheme does not improve DFT spreading by operations immediately before or after the DFT spreading, so it is difficult to use a unified transmitter structure with NCP, UW, FDSS and other enhancement technologies.

Therefore, according to an example of the present disclosure, a new compression method is proposed. In this compression method, a zero-padding operation is performed according to a sequence to be compressed before a DFT spreading operation, and a data deletion and superimposition operation is performed after the DFT spreading operation, so as to be compatible with the existing improved schemes based on DFT-s-OFDM while realizing flexible time-domain compression.

Hereinafter, an electronic device 100 according to an embodiment of the present disclosure will be described with reference to FIG. 1. FIG. 1 is a block diagram illustrating an electronic device 100 according to an embodiment of the present disclosure. As shown in FIG. 1, the electronic device 100 includes an input unit 110 and a processing unit 120. The electronic device 100 may further include other components (e.g., a transmitting unit for transmitting a compressed sequence, such as an antenna, etc.), however, since these components are irrelevant to content of the embodiment of the present disclosure, their illustration and description are omitted herein.

As shown in FIG. 1, the input unit 110 may obtain a sequence to be compressed, the sequence to be compressed has Q time-domain symbol elements, and Q is an integer greater than zero. According to an example of the present disclosure, the sequence to be compressed may be a data sequence to be transmitted by the electronic device 100, or a combination of the data sequence and other sequences, for example, a combination of the data sequence and a sequence for at least one of NCP and UW.

The input unit 110 may obtain the sequence to be compressed from other units included in the electronic device 100, or may obtain the sequence to be compressed from other units independent of the electronic device 100.

The processing unit 120 may perform a zero-padding operation on the sequence to be compressed according to at least a part of a compression factor to determine a zero-embedded sequence. In the embodiment of the present disclosure, the compression factor may refer to a ratio of the number of elements of a compressed sequence determined by the processing unit 120 to the number of elements of the sequence to be compressed obtained by the input unit 110 as described below, or it may refer to a ratio of the number of elements of the sequence to be transmitted determined by the processing unit 120 to the number of elements of the sequence to be compressed obtained by the input unit 110 as described below.

In addition, the compression factor may be set to $\alpha$, the $\alpha$ may be set to $\alpha=b/c$, $b\leq c$, b and c are positive integers, and b is related to the number of zeros in the zero-padding operation described below. For example, in the zero-padding operation described below, each element in the sequence to be compressed may be supplemented with the number of zeros indicated by b along the direction of the column. For each element in the sequence to be compressed, the corresponding number of zeros to be supplemented may be the same or different. The c may be related to the number of DFT spreading subsets described below or the number of sampling points of a DFT spreading set. In the zero-padding operation, it is necessary to make the number of elements of the zero-embedded sequence determined after the zero-padding operation consistent with the number of sampling points of the DFT spreading set.

The processing unit 120 may perform the zero-padding operation on the sequence to be compressed according to the compression factor $\alpha$ to determine the zero-embedded sequence. The processing unit 120 may also perform the zero-padding operation on the sequence to be compressed according to at least a part of the compression factor $\alpha$ to determine the zero-embedded sequence. For example, the processing unit 120 performs the zero-padding operation on the sequence to be compressed according to at least one of b and c to determine the zero-embedded sequence.

The electronic device 100 may be further provided with a receiving unit 130, and the receiving unit 130 may receive compression information indicating at least the part of the compression factor. For example, the compression information may explicitly indicate the compression factor $\alpha$, or may implicitly indicate the compression factor $\alpha$ by indicating at least one of b and c. The b and c may be independent or interrelated.

The compression information may be notified to the electronic device 100 via any one of Radio Resource Control (RRC) signaling, MAC control element (MAC CE) or Downlink Control Information (DCI). For example, a new field or parameter may be defined in any one of RRC, MAC CE and DCI, for notifying the compression information. Alternatively, a new field or parameter may be set for b and c separately in the case where b and c are independent, and one new field or parameter may be set for b and c in the case where b and c are interrelated. The electronic device may assume that the compression factor $\alpha$ corresponding to the field or parameter, or b and c associated with it, is equal to one in the case where the above-mentioned field or parameter is not set. Alternatively, the compression factor $\alpha$, or b and c associated with it, may also be stored in the electronic device in advance.

The processing unit 120 may perform a discrete Fourier transform spreading operation according to the zero-embedded sequence to determine a spread sequence. According to an example of the present disclosure, when performing the DFT spreading operation, the processing unit 120 may perform the DFT spreading operation using an N-point DFT spreading set according to the zero-embedded sequence to determine the spread sequence. Here, N is an integer multiple of the number M of frequency-domain symbols included in the compressed sequence.

Alternatively, it may be further set that the N-point DFT spreading set includes a plurality of DFT spreading subsets, for example, c DFT spreading subsets, and c is a positive integer. Each DFT spreading subset has M points. In this case, the processing unit 120 may re-order the zero-embedded sequence before performing the DFT spreading operation to determine a plurality of zero-embedded subsequences, thereafter perform an M-point DFT spreading operation on each zero-embedded subsequence to determine a plurality of spread subsequences.

After performing the DFT spreading, the processing unit 120 may perform at least one of a data deletion operation and a data superimposition operation based on the spread sequence to determine a compressed sequence, wherein the compressed sequence has M frequency-domain symbols, M is an integer greater than zero, and M is less than or equal to Q.

When performing the DFT spreading operation by using one N-point DFT spreading set, the processing unit 120 may perform the data deletion operation based on the spread sequence determined after the DFT spreading operation to determine the compressed sequence. The data deletion operation may be a frequency data deletion operation.

When performing the DFT spreading operation by using a plurality of M-point DFT spreading subsets, the processing unit 120 may perform the data superimposition operation based on the plurality of spread subsequences determined after the DFT spreading operation to determine the compressed sequence. The data superimposition operation includes performing phase compensation for the plurality of spread subsequences respectively, and superimposing the plurality of phase-compensated spread subsequences.

The processing unit 120 may further perform subcarrier mapping and inverse discrete Fourier transform according to the compressed sequence to determine a sequence to be transmitted. The processing unit 120 is further configured to further perform a second data deletion after the subcarrier mapping and the inverse discrete Fourier transform are performed according to the compressed sequence, to determine the sequence to be transmitted. The second data deletion may be a time-domain data deletion operation.

The processing unit 120 may further perform a parallel-to-serial conversion operation and cyclic prefix insertion (CP insertion) based on the sequence to be transmitted according to a specific situation. The processing unit 120 may further perform the serial-to-parallel operation on a data sequence of the sequence to be compressed as input before the zero-padding operation according to a specific situation, so as to facilitate the zero-padding operation.

Therefore, by performing the zero-padding operation on the sequence to be compressed before the DFT spreading operation, and performing at least one of the data deletion operation and the data superimposition operation after the DFT spreading operation, time-domain compression is realized, and more data can be transmitted with less resource. Meanwhile, with this structure, compatibility with the existing improved schemes based on DFT-s-OFDM can be easily realized, for example, compatibility with the improved scheme based on NCP/UW, or compatibility with the improved scheme based on FDSS, or compatibility with the improved scheme based on NCP/UW and FDSS can be achieved.

The electronic device according to the embodiment of the present disclosure, during the zero-padding operation, may perform the zero-padding operation on the sequence to be compressed according to a single compression factor to determine the zero-embedded sequence. Alternatively, the zero-padding operation may also be performed on the sequence to be compressed according to a plurality of compression factors to determine the zero-embedded sequence.

Hereinafter, operations performed by the input unit 110 and the processing unit 120 in the case of a single compression factor will be described with reference to FIGS. 2 to 5, and operations performed by the input unit 110 and the processing unit 120 in the case of a plurality of compression factors will be described with reference to FIGS. 6 to 9.

Figure 2:
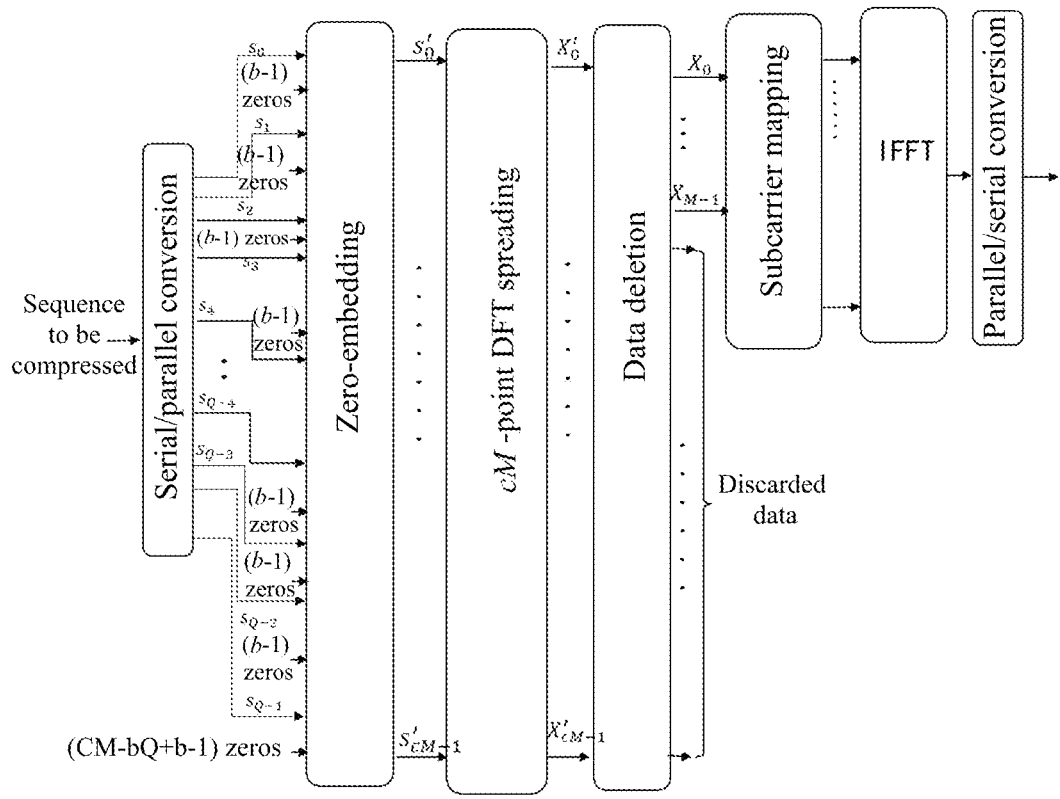
FIG. 2 is a schematic diagram showing that the electronic device 100 transmits more data with the same time as a specific transmission time according to an embodiment of the present disclosure.

FIG. 2 is a schematic diagram showing that the electronic device 100 transmits more data with the same time as a specific transmission time according to an embodiment of the present disclosure.

In FIG. 2, the processing unit 120 is further configured to perform the zero-padding operation on the sequence to be compressed according to a single compression factor to determine the zero-embedded sequence; perform the DFT spreading operation with a single cM-point DFT set to determine the spread sequence; and perform the data deletion operation according to the determined spread sequence (that is, discarding part of data in the DFT spread sequence), to determine the compressed sequence.

As shown in FIG. 2, according to an example of the present disclosure, the compression factor is set to $$\alpha = \frac{b}{c}, b \leq c,$$

c is a positive integer. The zero-embedded sequence $s'=[s'_0 \ldots s'_i \ldots s'_{cM-1}]^T$, $0 \leq i \leq cM-1$ is determined after the zero-padding operation is performed on the sequence to be compressed $s=[s_0 \ldots s_i \ldots s_{Q-1}]^T$, $0 \leq i \leq Q-1$ according to the compression factor $\alpha$, and the cM-point DFT spreading operation is performed according to the zero-embedded sequence to determine the DFT spread sequence $X'=[X'_0 \ldots X'_i \ldots X'_{cM-1}]^T$, $0 \leq i \leq cM-1$. Next, data deletion is performed based on the DFT spread sequence to determine the compressed sequence $X=[X_0 \ldots X_i \ldots X_{M-1}]^T$, $0 \leq i \leq M-1$, where the compressed sequence has M frequency-domain symbols, M is an integer greater than zero, and M is less than or equal to Q.

In the zero-padding operation, the processing unit 120 supplements each element among the first (Q−1) elements in the sequence to be compressed $s=[s_0 \ldots s_i \ldots s_{Q-1}]^T$ having Q time-domain symbols with (b−1) zeros, and supplements the last element $s_{Q-1}$ in the sequence s to be compressed with (CM−bQ+b−1) zeros, to obtain the zero-embedded sequence $s'=[s'_0 \ldots s'_i \ldots s'_{cM-1}]^T$. Thus, the i-th element $s'_i$ in the zero-embedded sequence $s'=[s'_0 \ldots s'_i \ldots s'_{cM-1}]^T$ may also be expressed by Formula (1):

$$s'_i = \begin{cases} s_{i/b}, & i \in \{0, b, \cdots, b(Q-1)\} \\ 0, & i \notin \{0, b, \cdots, b(Q-1)\} \end{cases} \quad (1)$$

The sequence to be compressed $s=[s_0 \ldots s_i \ldots s_{Q-1}]^T$ with Q time-domain symbols becomes the zero-embedded sequence $s'=[s'_0 \ldots s'_i \ldots s'_{cM-1}]^T$ with M×c time-domain symbols after the zero-padding operation. Next, the cM-point DFT spreading operation is performed on the zero-embedded sequence $s'=[s'_0 \ldots s'_i \ldots s'_{cM-1}]^T$, and $X'=[X'_0 \ldots X'_i \ldots X'_{cM-1}]^T$, $0 \leq i \leq cM-1$ may be obtained. Here, it may be set that $$Q = \left\lfloor \frac{c}{b} M \right\rfloor.$$

The relationship between the DFT spread sequence X' and the zero-embedded sequence s' may be shown by Formula (2):

$$X' = F^{cM} s' \quad (2)$$

where $F^{cM}$ is the cM-point DFT set. Data deletion is performed on the aforesaid DFT spread sequence X' to determine the compressed sequence $X=[X_0 \ldots X_i \ldots X_{M-1}]^T$, $0 \leq i \leq M-1$. Here, for the i-th element in the compressed sequence X, it may be calculated by Formula (3) as follows, where $0 \leq i \leq M-1$:

$$X_i = X'_i = \frac{1}{\sqrt{M}} \sum_{m=0}^{cM-1} s'_m e^{-\frac{j2\pi im}{cM}} = \frac{1}{\sqrt{M}} \sum_{m=0}^{Q-1} s_m e^{-j2\pi\left(\frac{b}{c}m\right)\frac{i}{M}} \quad (3)$$

When data deletion is performed on the above DFT spread sequence X', it is preferable to delete low-order harmonics in the frequency domain, so as to maintain relative integrity of data.

In addition, the processing unit 120 may further process the compressed sequence. For example, the compressed sequence $X=[X_0 \ldots X_i \ldots X_{M-1}]^T$ is sequentially subjected to a subcarrier mapping operation, an inverse discrete Fourier transform (IFFT) operation and a parallel-to-serial conversion operation and so on to determine the sequence to be transmitted. In addition, the processing unit 120 may further perform a serial-to-parallel operation on the data sequence to be compressed before the zero-padding operation to facilitate the zero-padding operation.

Thus, the processing unit 120 obtains the compressed sequence $X=[X_0 \ldots X_i \ldots X_{M-1}]^T$ with M elements based on the sequence to be compressed $s=[s_0 \ldots s_i \ldots s_{Q-1}]^T$ with Q elements. Thereafter, the processing unit 120 may further determine the sequence to be transmitted based on the compressed sequence. Compared with the existing schemes, the electronic device according to the embodiment of the present disclosure can use the same time as a current specific transmission time to transmit more data.

In addition, compatibility with the existing improved schemes based on DFT-s-OFDM can be easily realized by performing the zero-padding operation using a single compression factor before the DFT spreading operation based on a single cM-point DFT set and performing the data deletion operation after the DFT spreading operation based on the single cM-point DFT set.

In the embodiment shown in FIG. 2, the DFT spreading operation is performed based on the zero-embedded sequence with one cM-point DFT spreading set. Alternatively, the number c of M-point DFT spreading subsets may be used to perform the DFT spreading operation based on the zero-embedded sequence.

Figure 3:
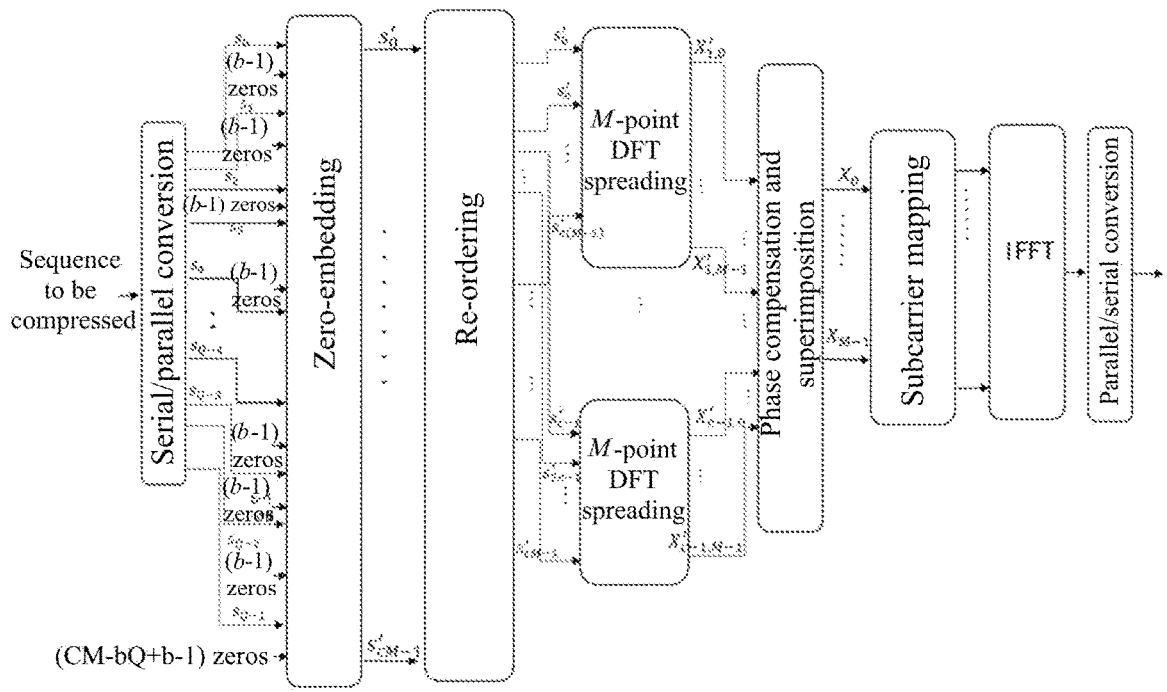
FIG. 3 is a schematic diagram showing that the electronic device 100 transmits more data with the same time as a specific transmission time according to another embodiment of the present disclosure.

FIG. 3 is a schematic diagram showing that the electronic device 100 transmits more data with the same time as a specific transmission time according to another embodiment of the present disclosure.

In FIG. 3, the processing unit 120 is further configured to perform the zero-padding operation on the sequence to be compressed according to a single compression factor to determine the zero-embedded sequence; next, re-order according to the zero-embedded sequence to determine a plurality of zero-embedded subsequences; perform the DFT spreading operation on each zero-embedded subsequence respectively with a plurality of M-point DFT subsets to determine a plurality of spread subsequences; and perform a data superimposition operation based on the plurality of spread subsequences to determine the compressed sequence. Further, the data superimposition operation may also include performing phase compensation for the plurality of spread subsequences respectively, and superimposing the plurality of phase-compensated spread subsequences, to determine the compressed sequence.

The zero-padding operation in FIG. 3 is the same as that in FIG. 2, and details thereof will not be repeatedly described herein again.

As shown in FIG. 3, the zero-embedded sequence $s'= [s'_0 \ldots s'_i \ldots s'_{cM-1}]^T$, $0 \leq i \leq cM-1$ is determined based on the zero-padding operation shown in FIG. 2. Next, re-ordering is performed according to the zero-embedded sequence s', to determine c zero-embedded subsequences with M elements, and the k-th zero-embedded subsequence (where k=0, 1, ..., c−1) among the c zero-embedded subsequences with M elements may also be shown as $\bar{s}'_k = [s'_{k+c} \ldots s'_{k+ic} \ldots s'_{k+(M-1)c}]^T$, $0 \leq i \leq M-1$. For each of the c zero-embedded subsequences, the DFT spreading operation is respectively performed with c M-point DFT spreading sets to determine c DFT spread subsequences.

For the k-th DFT spread subsequence (where k=0, 1, ..., c−1) among the c DFT spread subsequences, it may be shown as $X'_k = [X'_{k,0} \ldots X'_{k,i} \ldots X'_{k,M-1}]^T$, $0 \leq i \leq M-1$. Here, the relationship between the DFT spread subsequence $X'_k$ and the zero-embedded subsequence $\bar{s}'_k$ may be shown by Formula (4):

$$X'_k = F^M \bar{s}'_k \quad (4)$$

where $F^M$ is an M-point DFT set. The compressed sequence $X = [X_0 \ldots X_i \ldots X_{M-1}]^T$, $0 \leq i \leq M-1$ may be obtained by performing a phase compensation operation and data superimposition on the above c DFT spread subsequences X'. Here, for the i-th element in the compressed sequence X, it may be calculated by Formula (5) as follows, where $0 \leq i \leq M-1$:

$$X_i = \sum_{k=0}^{c-1} e^{-\frac{j2\pi ki}{cM}} X'_{k,i} =$$

$$\frac{1}{\sqrt{M}} \sum_{k=0}^{c-1} e^{-\frac{j2\pi ki}{cM}} \sum_{m=0}^{M-1} s'_{k+mc} e^{-\frac{j2\pi im}{M}} = \frac{1}{\sqrt{M}} \sum_{m=0}^{Q-1} s_m e^{-\frac{j2\pi i\left(\frac{b}{c}m\right)}{M}} \quad (5)$$

In addition, the processing unit 120 may further process the compressed sequence X. For example, the compressed sequence $X = [X_0 \ldots X_i \ldots X_{M-1}]^T$ is sequentially subjected to a subcarrier mapping operation, an inverse discrete Fourier transform (IFFT) operation and a parallel-to-serial conversion operation and so on to determine the sequence to be transmitted. In addition, the processing unit 120 may further perform a serial-to-parallel operation on the data sequence to be compressed before the zero-padding operation to facilitate the zero-padding operation.

Thus, the processing unit 120 obtains the compressed sequence $X = [X_0 \ldots X_i \ldots X_{M-1}]^T$ with M elements based on the sequence to be compressed $s = [s_0 \ldots s_i \ldots s_{Q-1}]^T$ with Q elements. Thereafter, the processing unit 120 may further determine the sequence to be transmitted based on the compressed sequence. Compared with the existing schemes, the electronic device according to the embodiment of the present disclosure can use the same time as a current specific transmission time to transmit more data.

In addition, compatibility with the existing improved schemes based on DFT-s-OFDM can be easily realized by performing the zero-padding operation using a single compression factor before the DFT spreading operation based on a plurality of M-point DFT sets and performing the data superimposition operation after the DFT spreading operation based on the plurality of M-point DFT sets.

Figure 4:
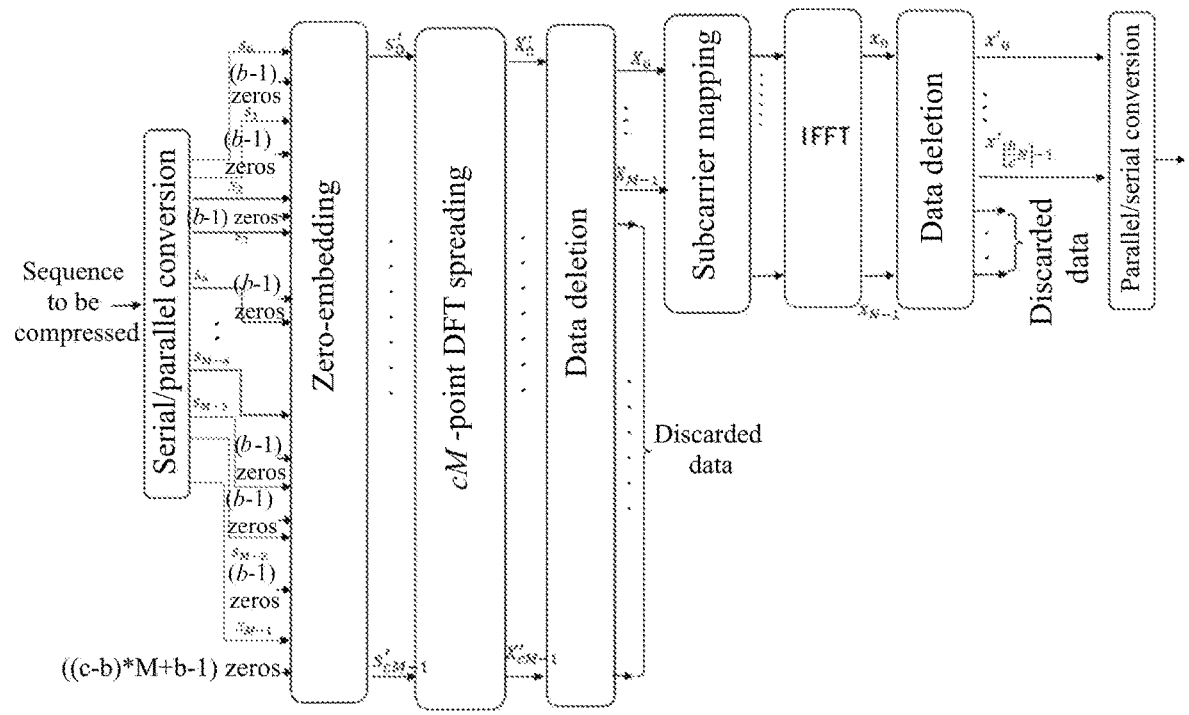
FIG. 4 is a schematic diagram showing that the electronic device 100 uses less time than a currently required transmission time to transmit a specific amount of data according to an embodiment of the present disclosure.

FIG. 4 is a schematic diagram showing that the electronic device 100 uses less time than a currently required transmission time to transmit a specific amount of data according to an embodiment of the present disclosure.

In FIG. 4, the processing unit 120 is further configured to perform the zero-padding operation on the sequence to be compressed according to a single compression factor to determine the zero-embedded sequence; perform the DFT spreading operation with a single cM-point DFT set to determine the spread sequence; and perform the data deletion operation according to the determined spread sequence (that is, discarding part of data in the DFT spread sequence) to determine the compressed sequence.

In FIG. 4, the processing unit 120 may be further configured to further perform second data deletion after performing subcarrier mapping and inverse discrete Fourier transform (IFFT) according to the compressed sequence, to determine the sequence to be transmitted. The second data deletion may be, for example, data deletion in the time domain. The embodiment shown in FIG. 4 differs from the embodiment shown in FIG. 2 at least in two aspects: the number of elements of the sequence to be compressed and the data deletion operation in the time domain.

In the embodiment shown in FIG. 2, the compressed sequence $X = [X_0 \ldots X_i \ldots X_{M-1}]^T$ with M elements is obtained based on the sequence to be compressed $s = [s_0 \ldots s_i \ldots s_{Q-1}]^T$ with Q elements. Compared with the currently provided schemes, the electronic device according to the embodiment of the present disclosure can use the same time as the current specific transmission time to transmit more data.

On the other hand, in the embodiment shown in FIG. 4, the compressed sequence $X = [X_0 \ldots X_i \ldots X_{M-1}]^T$ with M elements is obtained based on the sequence to be compressed $s = [s_0 \ldots s_i \ldots s_{M-1}]^T$ with M elements, and further, time-domain data deletion is performed after the subcarrier mapping and the inverse discrete Fourier transform are performed according to the compressed sequence, to determine the sequence to be transmitted. Compared with the currently provided schemes, the electronic device according to the embodiment of the present disclosure can use less time than a currently required transmission time to transmit a specific amount of data.

Because in the embodiment shown in FIG. 4, the example of the sequence to be compressed is a sequence to be compressed s=[$s_0 \ldots s_i \ldots s_{M-1}$]$^T$ with M elements, in order to be consistent with the cM-point DFT set, in the case where the first (M−1) elements in the sequence to be compressed s=[$s_0 \ldots s_i \ldots s_{M-1}$]$^T$ with M elements is supplemented with (b−1) zeros respectively, the last element $s_{M-1}$ in the sequence to be compressed s=[$s_0 \ldots s_i \ldots s_{M-1}$]$^T$ needs to be supplemented with ((c−b)×M+b−1) zeros, so as to determine the zero-embedded sequence, as shown in FIG. 4.

Furthermore, unlike the embodiment shown in FIG. 2, in the embodiment shown in FIG. 4, the processing unit 120 performs the data deletion in the time domain after the subcarrier mapping and the inverse discrete Fourier transform (IFFT) are performed according to the compressed sequence, to determine the sequence to be transmitted.

Specifically, the sequence to be transmitted x=[$x_0 \ldots x_i \ldots x_{N-1}$]$^T$, $0 \leq i \leq N-1$ with N elements is obtained after the subcarrier mapping and the inverse discrete Fourier transform are performed according to the compressed sequence X=[$X_0 \ldots X_i \ldots X_{M-1}$]$^T$. Further, the time-domain data deletion is performed according to the sequence to be transmitted, and the sequence after the time-domain data deletion has $$\left[\frac{b}{c}N\right]$$

time-domain elements, which may also be expressed as $$x' = \left[x'_0 \cdots x'_i \cdots x'_{\left[\frac{b}{c}N\right]-1}\right]^T, 0 \leq i \leq \left[\frac{b}{c}N\right]-1.$$

Thus, the processing unit 120 obtains the compressed sequence X=[$X_0 \ldots X_i \ldots X_{M-1}$]$^T$ with M elements based on the sequence to be transmitted s=[$s_0 \ldots s_i \ldots s_{M-1}$]$^T$ with M elements. Thereafter, the processing unit 120 further determines the sequence to be transmitted $$x' = \left[x'_0 \cdots x'_i \cdots x'_{\left[\frac{b}{c}N\right]-1}\right]^T \text{ with } \left[\frac{b}{c}N\right]$$

elements by further performing the time-domain data deletion based on the compressed sequence. Compared with the existing schemes, the electronic device according to the embodiment of the present disclosure can use less time to transmit a specific amount of data.

In addition, compatibility with the existing improved schemes based on DFT-s-OFDM can be easily realized by performing the zero-padding operation using a single compression factor before the DFT spreading operation based on a single cM-point DFT set and performing the data deletion operation after the DFT spreading operation based on the single cM-point DFT set.

Figure 5:
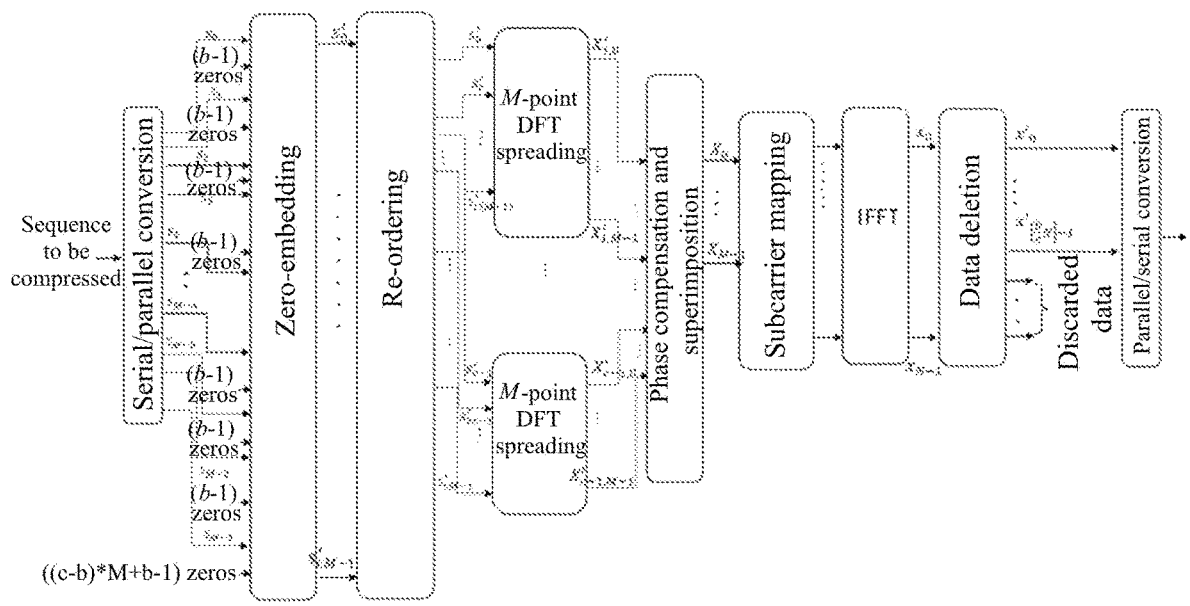
FIG. 5 is a schematic diagram showing that the electronic device 100 uses less time than a currently required transmission time to transmit a specific amount of data according to another embodiment of the present disclosure.

FIG. 5 is a schematic diagram showing that the electronic device 100 uses less time than a currently required transmission time to transmit a specific amount of data according to another embodiment of the present disclosure.

In FIG. 5, the processing unit 120 is further configured to perform the zero-padding operation on the sequence to be compressed according to a single compression factor to determine the zero-embedded sequence, next, re-order according to the zero-embedded sequence to determine a plurality of zero-embedded subsequences; perform a DFT spreading operation on each zero-embedded subsequence respectively with a plurality of M-point DFT subsets to determine a plurality of spread subsequences; and perform a data superimposition operation based on the plurality of spread subsequences to determine the compressed sequence. Further, the data superimposing operation may also include performing a phase compensation operation on the plurality of spread subsequences respectively, and superimposing the plurality of phase-compensated spread subsequences to determine the compressed sequence.

In FIG. 5, the processing unit 120 may be further configured to further perform second data deletion after performing subcarrier mapping and inverse discrete Fourier transform (IFFT) according to the compressed sequence, to determine the sequence to be transmitted. The second data deletion may be, for example, data deletion in the time domain. The embodiment shown in FIG. 5 differs from the embodiment shown in FIG. 3 at least in two aspects: the number of elements of the sequence to be compressed and the data deletion operation in the time domain.

In the embodiment shown in FIG. 3, the compressed sequence X=[$X_0 \ldots X_i \ldots X_{M-1}$]$^T$ with M elements is obtained based on the sequence to be compressed s=[$s_0 \ldots s_i \ldots s_{Q-1}$]$^T$ with Q elements. Compared with the currently provided schemes, the electronic device according to the embodiment of the present disclosure can use the same time as a current specific transmission time to transmit more data.

On the other hand, in the embodiment shown in FIG. 5, the compressed sequence X=[$X_0 \ldots X_i \ldots X_{M-1}$]$^T$ with M elements is obtained based on the sequence to be compressed s=[$s_0 \ldots s_i \ldots s_{M-1}$]$^T$ with M elements, and further, time-domain data deletion is performed after the subcarrier mapping and the inverse discrete Fourier transform are performed according to the compressed sequence, to determine the sequence to be transmitted. Compared with the currently provided schemes, the electronic device according to the embodiment of the present disclosure can use less time than a currently required transmission time to transmit a specific amount of data.

Because in the embodiment shown in FIG. 5, the example of the sequence to be compressed is a sequence to be compressed s=[$s_0 \ldots s_i \ldots s_{M-1}$]$^T$ with M elements, in order to be consistent with the cM-point DFT set, in the case where the first (M−1) elements in the sequence to be compressed s=[$s_0 \ldots s_i \ldots s_{M-1}$]$^T$ with M elements is supplemented with (b−1) zeros respectively, the last element $s_{M-1}$ in the sequence to be compressed s=[$s_0 \ldots s_i \ldots s_{M-1}$]$^T$ needs to be supplemented with ((c−b)×M+b−1) zeros, so as to determine the zero-embedded sequence, as shown in FIG. 5.

Furthermore, unlike the embodiment shown in FIG. 3, in the embodiment shown in FIG. 5, the processing unit 120 performs the data deletion in the time domain after the subcarrier mapping and the inverse discrete Fourier transform (IFFT) are performed according to the compressed sequence, to determine the sequence to be transmitted.

Specifically, the sequence to be transmitted x=[$x_0 \ldots x_i \ldots x_{N-1}$]$^T$, $0 \leq i \leq N-1$ with N elements is obtained after subcarrier mapping and inverse discrete Fourier transform are performed according to the compressed sequence X=[$X_0 \ldots X_i \ldots X_{M-1}$]$^T$. Further, time-domain data deletion is performed according to the sequence to be transmitted, and the sequence after the time-domain data deletion has $$\left[\frac{b}{c}N\right]$$

time-domain elements, which may also be expressed as $$x' = \left[x'_0 \ldots x'_i \ldots x'_{\left[\frac{b}{c}N\right]-1}\right]^T, 0 \le i \le \left[\frac{b}{c}N\right] - 1.$$

Thus, the processing unit 120 obtains the compressed sequence $X=[X_0 \ldots X_i \ldots X_{M-1}]^T$ with M elements based on the sequence to be transmitted $s=[s_0 \ldots s_i \ldots s_{M-1}]^T$ with M elements. Thereafter, the processing unit 120 further determines the sequence to be transmitted $$x' = \left[x'_0 \ldots x'_i \ldots x'_{\left[\frac{b}{c}N\right]-1}\right]^T \text{ with } \left[\frac{b}{c}N\right]$$

elements by further performing the time-domain data deletion based on the compressed sequence. Compared with the existing schemes, the electronic device according to the embodiment of the present disclosure can use less time to transmit a specific amount of data.

In addition, compatibility with the existing improved schemes based on DFT-s-OFDM can be easily realized by performing the zero-padding operation using a single compression factor before the DFT spreading operation based on a plurality of M-point DFT sets and performing the data superimposition operation after the DFT spreading operation based on the plurality of M-point DFT sets.

The electronic device according to the embodiment of the present disclosure can perform the zero-padding operation on the sequence to be compressed according to a single compression factor to determine the zero-embedded sequence. Alternatively, the zero-padding operation may also be performed on the sequence to be compressed according to a plurality of compression factors to determine the zero-embedded sequence.

Hereinafter, operations performed by the input unit 110 and the processing unit 120 in the case of a plurality of compression factors will be described with reference to FIGS. 6 to 9.

Figure 6:
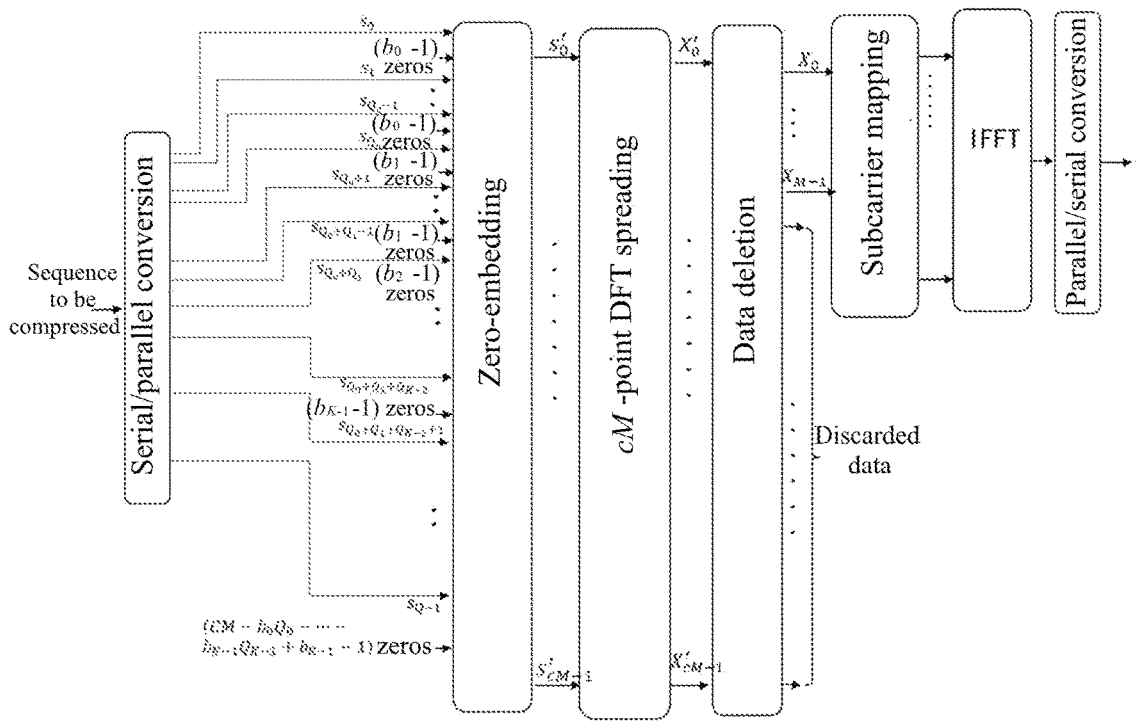
FIG. 6 is a schematic diagram showing that the electronic device 100 transmits more data with the same time as a specific transmission time according to an embodiment of the present disclosure.

FIG. 6 is a schematic diagram showing that the electronic device 100 transmits more data with the same time as a specific transmission time according to an embodiment of the present disclosure.

In FIG. 6, the processing unit 120 is further configured to perform the zero-padding operation on the sequence to be compressed according to a plurality of compression factors to determine the zero-embedded sequence; perform the DFT spreading operation with a single cM-point DFT set to determine the spread sequence; and perform the data deletion operation according to the determined spread sequence (that is, discarding part of data in the DFT spread sequence) to determine the compressed sequence.

According to an example of the present disclosure, the compression factors include a first compression factor and a second compression factor.

In the zero-padding operation, the processing unit 120 is further configured to compress a part of the sequence to be compressed by the first compression factor and compress another part of the sequence to be compressed by the second compression factor, to determine the zero-embedded sequence. In addition, the number of compression factors is not limited to two, but may be more than two. For example, the sequence of the compression factor may be set to $\alpha = [\alpha_0 \ldots \alpha_i \ldots \alpha_{K-1}]$, $0 \le i \le K-1$. As mentioned above, according to the example of the present disclosure, $$\alpha = \frac{b}{c}, b \le c,$$

and c is a positive integer. Therefore, it may be assumed that at least one of b and c also changes with the selection of $\alpha$. For example, b may be expressed as $b=[b_0 \ldots b_i \ldots b_{K-1}]^T$, the i-th element in the sequence that may be set as the compression factor is $$\alpha_i = \frac{b_i}{c}, b_i \le c,$$

and c is a positive integer.

The zero-embedded sequence $s'=[s'_0 \ldots s'_i \ldots s'_{cM-1}]^T$, $0 \le i \le cM-1$ is determined after the zero-padding operation is performed on the sequence to be compressed $s=[s_0 \ldots s_i \ldots s_{Q-1}]^T$, $0 \le i \le Q-1$ according to the compression factor sequence $\alpha=[\alpha_0 \ldots \alpha_i \ldots \alpha_{K-1}]$, and the cM-point DFT spreading operation is performed according to the zero-embedded sequence to determine the DFT spread sequence $X'=[X'_0 \ldots X'_i \ldots X'_{cM-1}]^T$, $0 \le i \le cM-1$. Next, data deletion is performed based on the DFT spread sequence to determine the compressed sequence $X=[X_0 \ldots X_i \ldots X_{M-1}]^T$, $0 \le i \le M-1$, where the compressed sequence has M frequency-domain symbols, M is an integer greater than zero, and M is less than or equal to Q. Here, $Q=\Sigma_{k=1}^{K-1}Q_k$, and $M=\Sigma_{k=1}^{K-1}M_k$.

In the zero-padding operation, the processing unit 120 supplements $(b_k-1)$ zeros to each of the first Q−1 elements in the sequence to be compressed $s=[s_0 \ldots s_i \ldots s_{Q-1}]^T$ with Q time-domain symbols, and supplements (CM−$b_0Q_0-\ldots-b_{K-1}Q_{K-1}+b_{K-1}-1$) zeros to the last element $s_{Q-1}$ of the sequence to be compressed s. For example, the i-th element $s'_i$ in the zero-embedded sequence $s'=[s'_0 \ldots s'_i \ldots s'_{cM-1}]^T$ may also be expressed by Formula (6):

$$s'_i = \begin{cases} s_{i/b_0}, & i \in \{0, b_0, \ldots, b_0(Q_0-1)\} \\ s_{(i-b_0Q_0)/b_1}, & i \in \{b_0Q_0, b_0Q_0+b_1, \ldots, b_0Q_0+b_1(Q_1-1)\} \\ \vdots \\ s_{(i-\Sigma_{k=0}^{K-1}b_kQ_k)/b_{K-1}}, & i \in \left\{\begin{array}{l}\Sigma_{k=0}^{K-2}b_kQ_k, \Sigma_{k=0}^{K-2}b_kQ_k+b_{K-1}, \ldots, \\ \Sigma_{k=0}^{K-2}b_kQ_k+b_{K-1}(Q_{K-1}-1)\end{array}\right\} \\ 0, & \text{other cases} \end{cases} \quad (6)$$

The sequence to be compressed $s=[s_0 \ldots s_i \ldots s_{Q-1}]^T$ with Q time-domain symbols becomes the zero-embedded sequence $s'=[s'_0 \ldots s'_i \ldots s'_{cM-1}]^T$ with M×c time-domain symbols after the zero-padding operation. Next, the cM-point DFT spreading operation is performed on the zero-embedded sequence $s'=[s'_0 \ldots s'_i \ldots s'_{cM-1}]^T$, and $X'=[X'_0 \ldots X'_i \ldots X'_{cM-1}]^T$, $0 \leq i \leq cM-1$ may be obtained. Here, it may be set that $$Q = \left\lfloor \frac{c}{b} M \right\rfloor. \text{ Since } Q = \sum_{k=0}^{K-1} Q_k,$$

for the k-th element of Q, $$Q_k = \left\lfloor \frac{c}{b_k} M_k \right\rfloor,$$

where $M_k$ satisfies $\Sigma_{k=1}^{K-1} M_k = M$.

The relationship between the DFT spread sequence X' and the zero-embedded sequence s' may be shown by Formula (7).

$$X' = F^{cM} s' \tag{7}$$

where $F^{cM}$ is the cM-point DFT set. Data deletion is performed on the aforesaid DFT spread sequence X' to determine the compressed sequence $X=[X_0 \ldots X_i \ldots X_{M-1}]^T$, $0 \leq i \leq M-1$. Here, for the i-th element in the compressed sequence X, it may be calculated by Formula (8) as follows, where $0 \leq i \leq M-1$.

$$X_i = X'_i = \frac{1}{\sqrt{M}} \sum_{m=0}^{cM-1} s'_m e^{-\frac{j2\pi im}{cM}} \tag{8}$$

When data deletion is performed on the above DFT spread sequence X', it is preferable to delete low-order harmonics in the frequency domain, so as to maintain relative integrity of data.

In addition, the processing unit 120 may further process the compressed sequence. For example, the compressed sequence $X=[X_0 \ldots X_i \ldots X_{M-1}]^T$ is sequentially subjected to a subcarrier mapping operation, an inverse discrete Fourier transform (IFFT) operation and a parallel-to-serial conversion operation and so on to determine the sequence to be transmitted. In addition, the processing unit 120 may further perform a serial-to-parallel operation on the data sequence to be compressed before the zero-padding operation to facilitate the zero-padding operation.

Thus, the processing unit 120 obtains the compressed sequence $X=[X_0 \ldots X_i \ldots X_{M-1}]^T$ with M elements based on the sequence to be compressed $s=[s_0 \ldots s_i \ldots s_{Q-1}]^T$ with Q elements. Thereafter, the processing unit 120 may further determine the sequence to be transmitted based on the compressed sequence. Compared with the existing schemes, the electronic device according to the embodiment of the present disclosure can use the same time as a current specific transmission time to transmit more data. Further, the processing unit 120 performs the zero-padding operation on the sequence to be compressed based on a plurality of compression factors to determine the zero-embedded sequence, which can achieve more flexible time-domain compression compared with the case based on a single compression factor.

In addition, compatibility with the existing improved schemes based on DFT-s-OFDM can be easily realized by performing the zero-padding operation using a plurality of compression factors before the DFT spreading operation based on a single cM-point DFT set and performing the data deletion operation after the DFT spreading operation based on the single cM-point DFT set.

Figure 7:
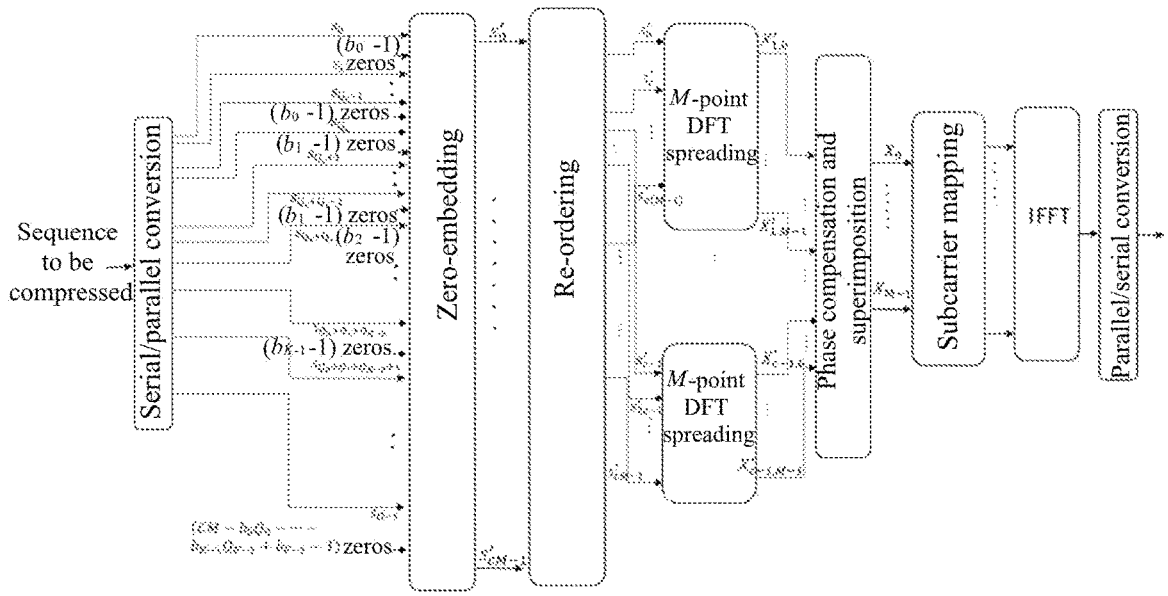
FIG. 7 is a schematic diagram showing that the electronic device 100 transmits more data with the same time as a specific transmission time according to another embodiment of the present disclosure.

In the embodiment shown in FIG. 7, the DFT spreading operation is performed based on the zero-embedded sequence with one cM-point DFT spreading set. Alternatively, the number c of M-point DFT spreading subsets may be used to perform the DFT spreading operation based on the zero-embedded sequence.

FIG. 7 is a schematic diagram showing that the electronic device 100 transmits more data with the same time as a specific transmission time according to another embodiment of the present disclosure.

In FIG. 7, the processing unit 120 is further configured to perform the zero-padding operation on the sequence to be compressed according to a plurality of compression factors to determine the zero-embedded sequence; next, re-order according to the zero-embedded sequence to determine a plurality of zero-embedded subsequences; perform the DFT spreading operation on each zero-embedded subsequence with a plurality of M-point DFT subsets to determine a plurality of spread subsequences; and perform the data superimposition operation based on the plurality of spread subsequences to determine the compressed sequence. Further, the data superimposing operation may also include performing a phase compensation operation on the plurality of spread subsequences respectively, and superimposing the plurality of phase-compensated spread subsequences to determine the compressed sequence.

The zero-embedding operation in FIG. 7 is the same as that in FIG. 6, and details thereof will not be repeatedly described herein again.

As shown in FIG. 7, the zero-embedded sequence $s'=[s'_0 \ldots s'_i \ldots s'_{cM-1}]^T$, $0 \leq i \leq cM-1$ is determined based on the zero-embedding operation as shown in FIG. 6. Then, re-ordering is performed according to the zero-embedded sequence s', to determine c zero-embedded subsequences with M elements, and the k-th zero-embedded subsequence (where k=0, 1, ..., c−1) among the c zero-embedded subsequences with M elements may also be shown as $\bar{s}'_k = [s'_{k+c} \ldots s'_{k+ic} \ldots s'_{k+(M-1)c}]^T$, $0 \leq i \leq M-1$. For each of the c zero-embedded subsequences, the DFT spreading operation is respectively performed with c M-point DFT spreading sets to determine c DFT spread subsequences.

For the k-th DFT subsequence (where k=0, 1, ..., c−1) among c DFT subsequences, it may be shown as $X'_k = [X'_{k,0} \ldots X'_{k,i} \ldots X'_{k,M-1}]^T$, $0 \leq i \leq M-1$. Here, the relationship between the DFT subsequence $X'_k$ and the zero-embedded subsequence $\bar{s}'_k$ may be shown by Formula (9):

$$X'_k = F^M \bar{s}'_k \tag{9}$$

where $F^M$ is an M-point DFT set. The compressed sequence $X=[X_0 \ldots X_i \ldots X_{M-1}]^T$, $0 \leq i \leq M-1$ may be obtained by performing the phase compensation operation and data superimposition on the above c DFT spread subsequences X'. Here, for the i-th element in the compressed sequence X, it may be calculated by Formula (10) as follows, where 0≤i≤M−1:

$$X_i = \sum_{k=0}^{c-1} e^{-\frac{j2\pi ki}{cM}} X'_{k,i} = \tag{10}$$

$$\frac{1}{\sqrt{M}} \sum_{k=0}^{c-1} e^{-\frac{j2\pi ki}{cM}} \sum_{m=0}^{M-1} s'_{k+mc} e^{-\frac{j2\pi im}{M}} = \frac{1}{\sqrt{M}} \sum_{m=0}^{cM-1} s'_m e^{-\frac{j2\pi im}{cM}}$$

In addition, the processing unit 120 may further process the compressed sequence X. For example, the compressed sequence X=[$X_0 \ldots X_i \ldots X_{M-1}$]$^T$ is sequentially subjected to a subcarrier mapping operation, an inverse discrete Fourier transform (IFFT) operation and a parallel-to-serial conversion operation and so on to determine the sequence to be transmitted. In addition, the processing unit 120 may further perform a serial-to-parallel operation on the data sequence to be compressed before the zero-padding operation to facilitate the zero-padding operation.

Thus, the processing unit 120 obtains a compressed sequence X=[$X_0 \ldots X_i \ldots X_{M-1}$]$^T$ with M elements based on the sequence to be compressed s=[$s_0 \ldots s_i \ldots s_{Q-1}$]$^T$ with Q elements. Thereafter, the processing unit 120 may further determine the sequence to be transmitted based on the compressed sequence. Compared with the existing schemes, the electronic device according to the embodiment of the present disclosure can use the same time as a current specific transmission time to transmit more data. Further, the processing unit 120 performs the zero-padding operation on the sequence to be compressed based on a plurality of compression factors to determine the zero-embedded sequence, which can achieve more flexible time-domain compression compared with the case based on a single compression factor.

In addition, compatibility with the existing improved schemes based on DFT-s-OFDM can be easily realized by performing the zero-padding operation using a plurality of compression factors before the DFT spreading operation based on a plurality of M-point DFT sets and performing the data superimposition operation after the DFT spreading operations based on the plurality of M-point DFT sets.

Figure 8:
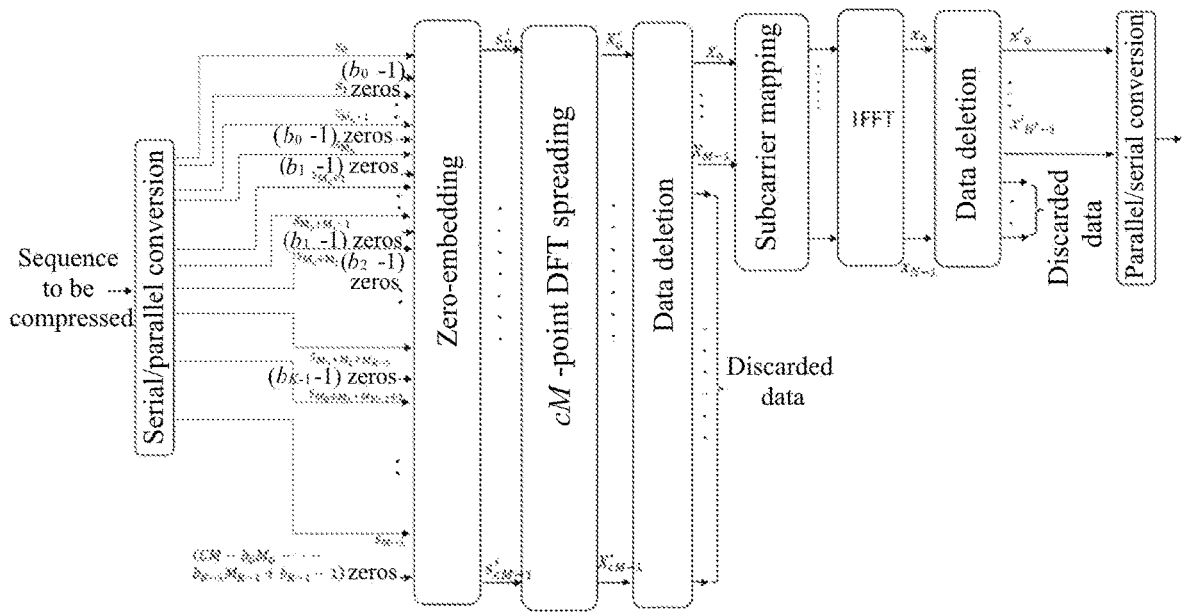
FIG. 8 is a schematic diagram showing that the electronic device 100 uses less time than a currently required transmission time to transmit a specific amount of data according to an embodiment of the present disclosure.

FIG. 8 is a schematic diagram showing that the electronic device 100 uses less time than a currently required transmission time to transmit a specific amount of data according to an embodiment of the present disclosure.

In FIG. 8, the processing unit 120 is further configured to perform the zero-padding operation on the sequence to be compressed according to a plurality of compression factors to determine the zero-embedded sequence; perform the DFT spreading operation with a single cM-point DFT set to determine the spread sequence; and perform the data deletion operation according to the determined spread sequence (that is, discarding part of data in the DFT spread sequence) to determine the compressed sequence.

In FIG. 8, the processing unit 120 may be further configured to further perform second data deletion after performing subcarrier mapping and inverse discrete Fourier transform (IFFT) according to the compressed sequence to determine the sequence to be transmitted. The second data deletion may be, for example, data deletion in the time domain. The embodiment shown in FIG. 8 differs from the embodiment shown in FIG. 6 at least in two aspects: the number of elements of the sequence to be compressed and the data deletion operation in the time domain.

In the embodiment shown in FIG. 6, the compressed sequence X=[$X_0 \ldots X_i \ldots X_{M-1}$]$^T$ with M elements is obtained based on the sequence to be compressed s=[$s_0 \ldots s_i \ldots s_{Q-1}$]$^T$ with Q elements. Compared with the currently provided schemes, the electronic device according to the embodiment of the present disclosure can use the same time as a current specific transmission time to transmit more data.

On the other hand, in the embodiment shown in FIG. 8, the compressed sequence X=[$X_0 \ldots X_i \ldots X_{M-1}$]$^T$ with M elements is obtained based on the sequence to be compressed s=[$s_0 \ldots s_i \ldots s_{M-1}$]$^T$ with M elements, and further, the time-domain data deletion is performed after the subcarrier mapping and the inverse discrete Fourier transform are performed according to the compressed sequence. Compared with the currently provided schemes, the electronic device according to the embodiment of the present disclosure can use less time than a currently required transmission time to transmit a specific amount of data.

Because in the embodiment shown in FIG. 8, the example of the sequence to be compressed is a sequence to be compressed s=[$s_0 \ldots s_i \ldots s_{M-1}$]$^T$ with M elements, in order to be consistent with the cM-point DFT set, in the case where the first M−1 elements in the sequence to be compressed s=[$s_0 \ldots s_i \ldots s_{M-1}$]$^T$ with M elements is supplemented with ($b_k$−1) zeros respectively, the last element $s_{M-1}$ in the sequence to be compressed s=[$s_0 \ldots s_i \ldots s_{M-1}$]$^T$ needs to be supplemented with (CM−$b_0 M_0$− $\ldots$ −$b_{K-1} M_{K-1}$+$b_{K-1}$−1) zeros, so as to determine the zero-embedded sequence, where $M_k$ satisfies $\Sigma_{k=1}^{K-1} M_k$=M, as shown in FIG. 8.

Furthermore, unlike the embodiment shown in FIG. 6, in the embodiment shown in FIG. 8, the processing unit 120 performs the data deletion in the time domain after the subcarrier mapping and the inverse discrete Fourier transform (IFFT) are performed according to the compressed sequence, to determine the sequence to be transmitted.

Specifically, the sequence to be transmitted x=[$x_0 \ldots x_i \ldots x_{N-1}$]$^T$ 0≤i≤N−1 with N elements is obtained after the subcarrier mapping and the inverse discrete Fourier transform are performed according to the compressed sequence X=[$X_0 \ldots X_i \ldots X_{M-1}$]$^T$. Further, the time-domain data deletion is performed according to the sequence to be transmitted, and the sequence after the time-domain data deletion has $$N' = \left\lceil \frac{N}{cM} \sum_{k=0}^{K-1} b_k M_k \right\rceil$$

time-domain elements, which may also be expressed as x'=[$x'_0 \ldots x'_i \ldots x'_{N'-1}$]$^T$, 0≤i≤N'−1.

Thus, the processing unit 120 obtains the compressed sequence X=[$X_0 \ldots X_i \ldots X_{M-1}$]$^T$ with M elements based on the sequence to be transmitted s=[$s_0 \ldots s_i \ldots s_{M-1}$]$^T$ with M elements. Thereafter, the processing unit 120 further determines the sequence to be transmitted $$x' = [x'_0 \ldots x'_i \ldots x'_{N'-1}]^T \text{ with } N' = \left\lceil \frac{N}{cM} \sum_{k=0}^{K-1} b_k M_k \right\rceil$$

elements by further performing the time-domain data deletion based on the compressed sequence. Compared with the existing schemes, the electronic device according to the embodiment of the present disclosure can use less time to transmit a specific amount of data. Further, the processing unit 120 performs the zero-padding operation on the sequence to be compressed based on a plurality of compression factors to determine the zero-embedded sequence, which can achieve more flexible time-domain compression compared with the case based on a single compression factor.

In addition, compatibility with the existing improved schemes based on DFT-s-OFDM can be easily realized by performing the zero-padding operation using a plurality of compression factors before the DFT spreading operation based on a single cM-point DFT set, and performing the data deletion operation after the DFT spreading operation based on the single cM-point DFT set.

Figure 9:
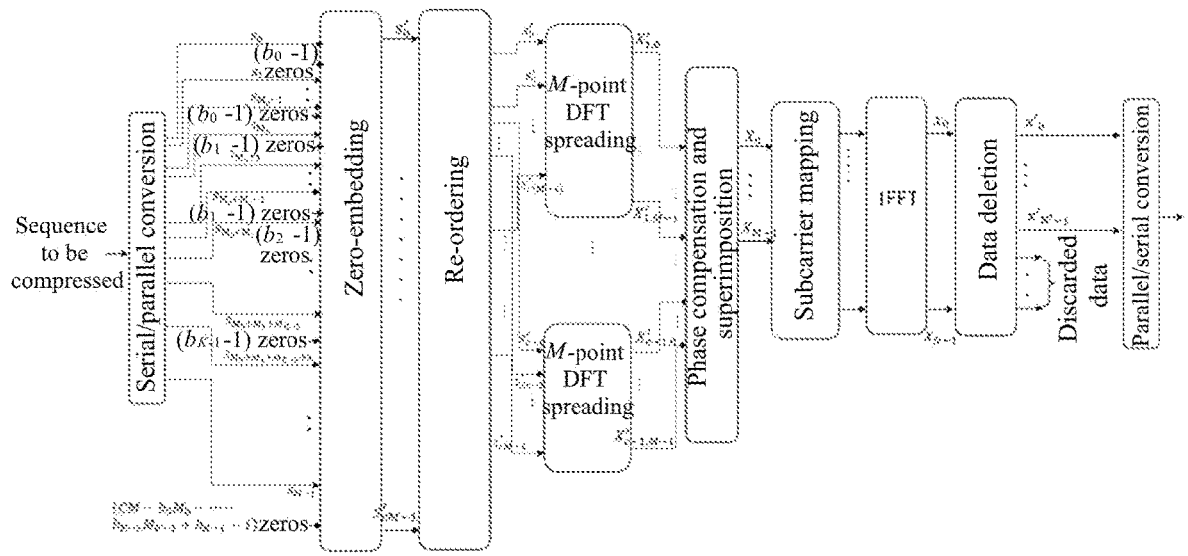
FIG. 9 is a schematic diagram showing that the electronic device 100 uses less time than a currently required transmission time to transmit a specific amount of data according to another embodiment of the present disclosure.

FIG. 9 is a schematic diagram showing that the electronic device 100 uses less time than a currently required transmission time to transmit a specific amount of data according to another embodiment of the present disclosure.

In FIG. 9, the processing unit 120 is further configured to perform the zero-padding operation on the sequence to be compressed according to a plurality of compression factors to determine the zero-embedded sequence; next, re-order according to the zero-embedded sequence to determine a plurality of zero-embedded subsequences; perform the DFT spreading operation on each zero-embedded subsequence with a plurality of M-point DFT subsets to determine a plurality of spread subsequences; and perform the data superimposition operation based on the plurality of spread subsequences to determine the compressed sequence. Further, the data superimposing operation may also include performing a phase compensation operation on the plurality of spread subsequences respectively, and superimposing the plurality of phase-compensated spread subsequences to determine the compressed sequence.

In FIG. 9, the processing unit 120 may be further configured to further perform second data deletion after performing subcarrier mapping and inverse discrete Fourier transform (IFFT) according to the compressed sequence, to determine the sequence to be transmitted. The second data deletion may be, for example, data deletion in the time domain. The embodiment shown in FIG. 9 differs from the embodiment shown in FIG. 7 at least in two aspects: the number of elements of the sequence to be compressed and the data deletion operation in the time domain.

In the embodiment shown in FIG. 7, the compressed sequence $X=[X_0 \ldots X_i \ldots X_{M-1}]^T$ with M elements is obtained based on the sequence to be compressed $s=[s_0 \ldots s_i \ldots s_{Q-1}]^T$ with Q elements. Compared with the currently provided schemes, the electronic device according to the embodiment of the present disclosure can use the same time as a current specific transmission time to transmit more data.

On the other hand, in the embodiment shown in FIG. 9, the compressed sequence $X=[X_0 \ldots X_i \ldots X_{M-1}]^T$ with M elements is obtained based on the sequence to be compressed $s=[s_0 \ldots s_i \ldots s_{M-1}]^T$ with M elements, and further, the time-domain data deletion is performed after the subcarrier mapping and the inverse discrete Fourier transform are performed according to the compressed sequence, to determine the sequence to be transmitted. Compared with the currently provided schemes, the electronic device according to the embodiment of the present disclosure can use less time than a currently required transmission time to transmit a specific amount of data.

Because in the embodiment shown in FIG. 9, the example of the sequence to be compressed is a sequence to be compressed $s=[s_0 \ldots s_i \ldots s_{M-1}]^T$ with M elements, in order to be consistent with the cM-point DFT set, in the case where the first M−1 elements in the sequence to be compressed $s=[s_0 \ldots s_i \ldots s_{M-1}]^T$ with M elements is supplemented with $(b_k-1)$ zeros respectively, the last element $s_{M-1}$ in the sequence to be compressed $s=[s_0 \ldots s_i \ldots s_{M-1}]^T$ needs to be supplemented with $(CM-b_0 M_0- \ldots -b_{K-1}M_{K-1}+b_{K-1}-1)$ zeros, so as to determine the zero-embedded sequence, where $M_k$ satisfies $\Sigma_{k=1}^{K-1} M_k = M$, as shown in FIG. 9.

In addition, unlike the embodiment shown in FIG. 7, in the embodiment shown in FIG. 9, the processing unit 120 performs the data deletion in the time domain after the subcarrier mapping and the inverse discrete Fourier transform (IFFT) are performed according to the compressed sequence to determine the sequence to be transmitted.

Specifically, the sequence to be transmitted $x=[x_0 \ldots x_i \ldots x_{N-1}]^T$, $0 \le i \le N-1$ with N elements is obtained after the subcarrier mapping and the inverse discrete Fourier transform are performed according to the compressed sequence $X=[X_0 \ldots X_i \ldots X_{M-1}]^T$. Further, the time-domain data deletion is performed according to the sequence to be transmitted, and the sequence after the time-domain data deletion has $$N' = \left[\frac{N}{cM}\sum_{k=0}^{K-1} b_k M_k\right]$$

time-domain elements, which may also be expressed as $x'=[x'_0 \ldots x'_i \ldots x'_{N'-1}]^T$, $0 \le i \le N'-1$.

Thus, the processing unit 120 obtains the compressed sequence $X=[X_0 \ldots X_i \ldots X_{M-1}]^T$ with M elements based on the sequence to be transmitted $s=[s_0 \ldots s_i \ldots s_{M-1}]^T$ with M elements. Thereafter, the processing unit 120 further determines the sequence to be transmitted $$x' = [x'_0 \ldots x'_i \ldots x'_{N'-1}]^T \text{ with } N' = \left[\frac{N}{cM}\sum_{k=0}^{K-1} b_k M_k\right]$$

elements by further performing the time-domain data deletion based on the compressed sequence. Compared with the existing schemes, the electronic device according to the embodiment of the present disclosure can use less time to transmit a specific amount of data. Further, the processing unit 120 performs the zero-padding operation on the sequence to be compressed based on a plurality of compression factors to determine the zero-embedded sequence, which can achieve more flexible time-domain compression compared with the case based on a single compression factor.

In addition, compatibility with the existing improved schemes based on DFT-s-OFDM can be easily realized by performing the zero-padding operation using a plurality of compression factors before the DFT spreading operations based on a plurality of M-point DFT sets and performing the data superimposition operation after the DFT spreading operations based on the plurality of M-point DFT sets.

Next, a method according to an embodiment of the present disclosure will be described with reference to FIG. 10.

Figure 10:
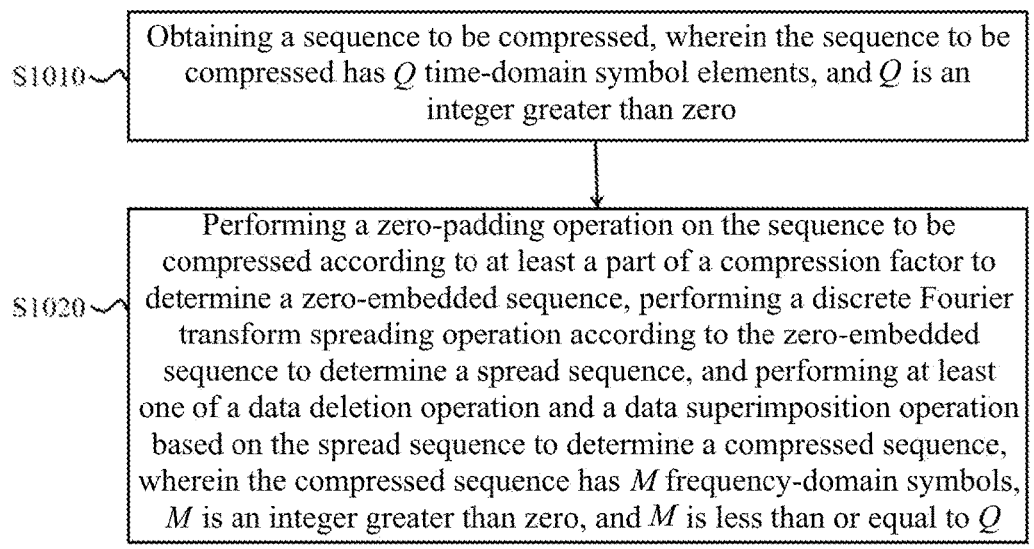
FIG. 10 is a flowchart illustrating a compression processing method 1000 performed by the electronic device 100 according to an embodiment of the present disclosure.

Hereinafter, FIG. 10 is a flowchart illustrating a compression processing method 1000 performed by the electronic device 100 according to an embodiment of the present disclosure. Since steps of the compression processing method 1000 performed by the electronic device 100 correspond to the operations of the electronic device 100 described above with reference to FIGS. 1 to 9, detailed description of the same content is omitted herein for the sake of simplicity.

As shown in FIG. 10, the compression processing method 1000 performed by the electronic device 100 includes an input step S1010 and a processing step S1020.

Specifically, in the example shown in FIG. 10, in the input step S1010, a sequence to be compressed is obtained, the sequence to be compressed having Q time-domain symbol elements, and Q being an integer greater than zero. In the processing step S1020, a zero-padding operation is performed on the sequence to be compressed according to at least a part of a compression factor to determine a zero-embedded sequence, a discrete Fourier transform spreading operation is performed according to the zero-embedded sequence to determine a spread sequence, and at least one of a data deletion operation and a data superimposition operation is performed based on the spread sequence to determine a compressed sequence, where the compressed sequence has M frequency-domain symbols, M is an integer greater than zero, and M is less than or equal to Q.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 11:
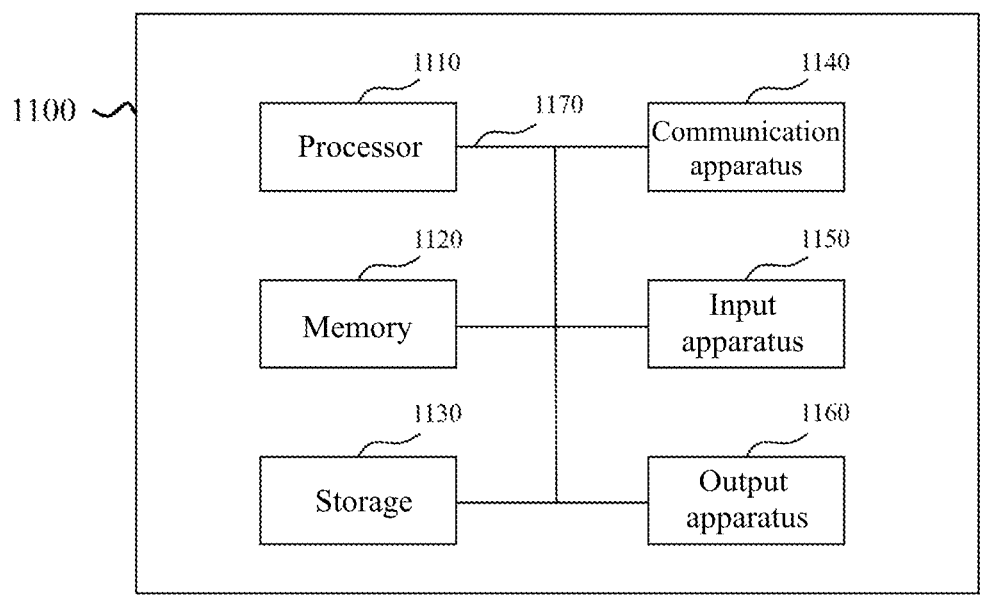
FIG. 11 is a schematic diagram of a hardware structure of a device 1100 involved according to an embodiment of the present disclosure.

For example, a device (such as a terminal, a base station and so on) in an embodiment of the present disclosure may function as a computer that executes the processes of the wireless communication method of the present disclosure. FIG. 11 is a schematic diagram of a hardware structure of a device 1100 involved in an embodiment of the present disclosure. The above device 1100 may be constituted as a computer apparatus that physically comprises a processor 1110, a memory 1120, a storage 1130, a communication apparatus 1140, an input apparatus 1150, an output apparatus 1160, a bus 1170 and the like In addition, in the following description, terms such as "apparatus" may be replaced with circuits, devices, units, and the like. The hardware structure of the terminal may include one or more of the respective apparatuses shown in the figure, or may not include a part of the apparatuses.

For example, only one processor 1110 is illustrated, but there may be multiple processors. Furthermore, processes may be performed by one processor, or processes may be performed by more than one processor simultaneously, sequentially, or with other methods. In addition, the processor 1110 may be installed by more than one chip.

Respective functions of any of the device 1100 may be implemented, for example, by reading specified software (program) on hardware such as the processor 1110 and the memory 1120, so that the processor 1110 performs computations, controls communication performed by the communication apparatus 1140, and controls reading and/or writing of data in the memory 1120 and the storage 1130.

The processor 1110, for example, operates an operating system to control the entire computer. The processor 1110 may be constituted by a Central Processing Unit (CPU), which includes interfaces with peripheral apparatuses, a control apparatus, a computing apparatus, a register and the like. For example, the processing unit described above may be implemented by the processor 1110.

In addition, the processor 1110 reads programs (program codes), software modules and data from the storage 1130 and/or the communication apparatus 1140 to the memory 1120, and execute various processes according to them. As for the program, a program causing computers to execute at least a part of the operations described in the above embodiments may be employed. For example, the processing unit of the terminal may be implemented by a control program stored in the memory 1120 and operated by the processor 1110, and other functional blocks may also be implemented similarly.

The memory 1120 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 1120 may also be referred to as a register, a cache, a main memory (a main storage apparatus) and the like. The memory 1120 may store executable programs (program codes), software modules and the like for implementing a method involved in an embodiment of the present disclosure.

The storage 1130 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 1130 may also be referred to as an auxiliary storage apparatus.

The communication apparatus 1140 is a hardware (transceiver device) performing communication between computers via a wired and/or wireless network, and is also referred to as a network device, a network controller, a network card, a communication module and the like, for example. The communication apparatus 1140 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 1140.

The input apparatus 1150 is an input device (e.g., a keyboard, a mouse, a microphone, a switch, a button, a sensor and the like) that receives input from the outside. The output apparatus 1160 is an output device (e.g., a display, a speaker, a Light Emitting Diode (LED) light and the like) that performs outputting to the outside. In addition, the input apparatus 1150 and the output apparatus 1160 may also be an integrated structure (e.g., a touch screen).

Furthermore, the respective apparatuses such as the processor 1110 and the memory 1120 are connected by the bus 1170 that communicates information. The bus 1170 may be constituted by a single bus or by different buses between the apparatuses.

Furthermore, the terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 1110 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, RRC (Radio Resource Control) signaling, broadcast information (Master Information Blocks (MIBs), System Information Blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the first communication device or the second communication device in device 1100 described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by the first communication device and the second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM®), Code Division Multiple Access 3000 (CDMA 3000), Ultra Mobile Broadband (UMB), IEEE 802.11 (Wi-Fi®), IEEE 802.16 (WiMAX®), IEEE 802.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. An electronic device, comprising:
   an input unit configured to obtain a sequence to be compressed, wherein the sequence to be compressed has Q time-domain symbol elements, and Q is an integer greater than zero;
   a processing unit configured to perform a zero-padding operation on the sequence to be compressed according to at least a part of a compression factor to determine a zero-embedded sequence, perform a discrete Fourier transform spreading operation according to the zero-embedded sequence to determine a spread sequence, and perform at least one of a data deletion operation and a data superimposition operation based on the spread sequence to determine a compressed sequence, wherein the compressed sequence has M frequency-domain symbols, M is an integer greater than zero, and M is less than or equal to Q.

2. The electronic device of claim 1, wherein
   the processing unit is configured to perform an N-point discrete Fourier transform spreading operation according to the zero-embedded sequence to determine the spread sequence, and perform a first data deletion operation based on the spread sequence to determine the compressed sequence, wherein N is an integer multiple of M.

3. The electronic device of claim 1, wherein
   the processing unit is further configured to re-order according to the zero-embedded sequence to determine a plurality of zero-embedded subsequences, perform an A-point discrete Fourier transform spreading operation on each zero-embedded subsequence respectively to determine a plurality of spread subsequences, and perform the data superimposition operation based on the plurality of spread subsequences to determine the compressed sequence.

4. The electronic device of claim 3, wherein
the data superimposition operation includes performing a phase compensation operation on the plurality of spread subsequences respectively, and superimposing the plurality of phase-compensated spread subsequences.

5. The electronic device of claim 1, wherein
the processing unit is further configured to perform subcarrier mapping and inverse discrete Fourier transform according to the compressed sequence to determine a sequence to be transmitted.

6. The electronic device of claim 5, wherein
the processing unit is further configured to further perform second data deletion after performing the subcarrier mapping and the inverse discrete Fourier transform according to the compressed sequence, to determine the sequence to be transmitted.

7. The electronic device of claim 1, wherein
the compression factor includes a first compression factor and a second compression factor, and
in the zero-padding operation, the processing unit is further configured to compress a part of the sequence to be compressed by the first compression factor and compress another part of the sequence to be compressed by the second compression factor, to determine the zero-embedded sequence.

8. The electronic device of claim 1, further comprising:
a receiving unit configured to receive compression information indicating at least the part of the compression factor.

9. The electronic device of claim 8, wherein
the compression information is transmitted via any one of Radio Resource Control (RRC) signaling, MAC control element (MAC CE) and Downlink Control Information (DCI).

10. A compression processing method, comprising:
an input step configured to obtain a sequence to be compressed, wherein the sequence to be compressed has Q time-domain symbol elements, and Q is an integer greater than zero;
a processing step configured to perform a zero-padding operation on the sequence to be compressed according to at least a part of a compression factor to determine a zero-embedded sequence, perform a discrete Fourier transform spreading operation according to the zero-embedded sequence to determine a spread sequence, and perform at least one of a data deletion operation and a data superimposition operation based on the spread sequence to determine a compressed sequence, wherein the compressed sequence has M frequency-domain symbols, M is an integer greater than zero, and M is less than or equal to Q.

* * * * *